(No Model.) 2 Sheets—Sheet 1.
J. G. JONES.
CAN SOLDERING MACHINE.
No. 263,659. Patented Aug. 29, 1882.
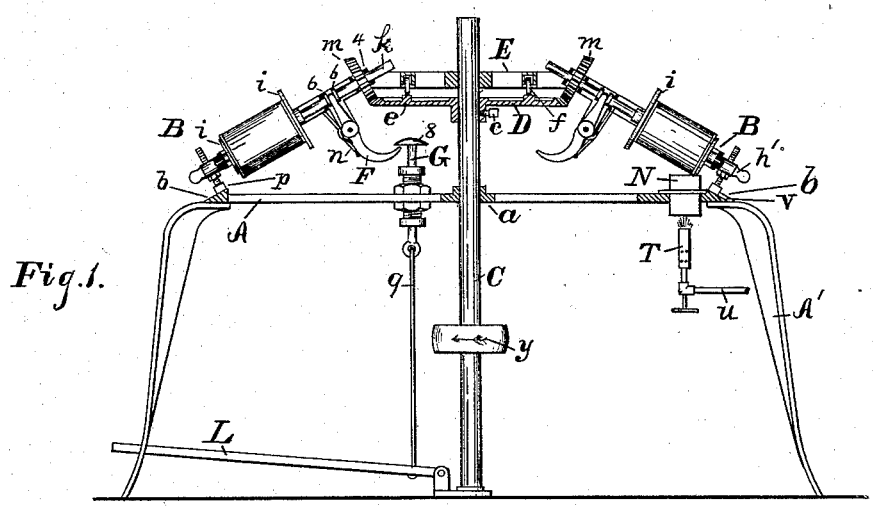
Fig. 1.
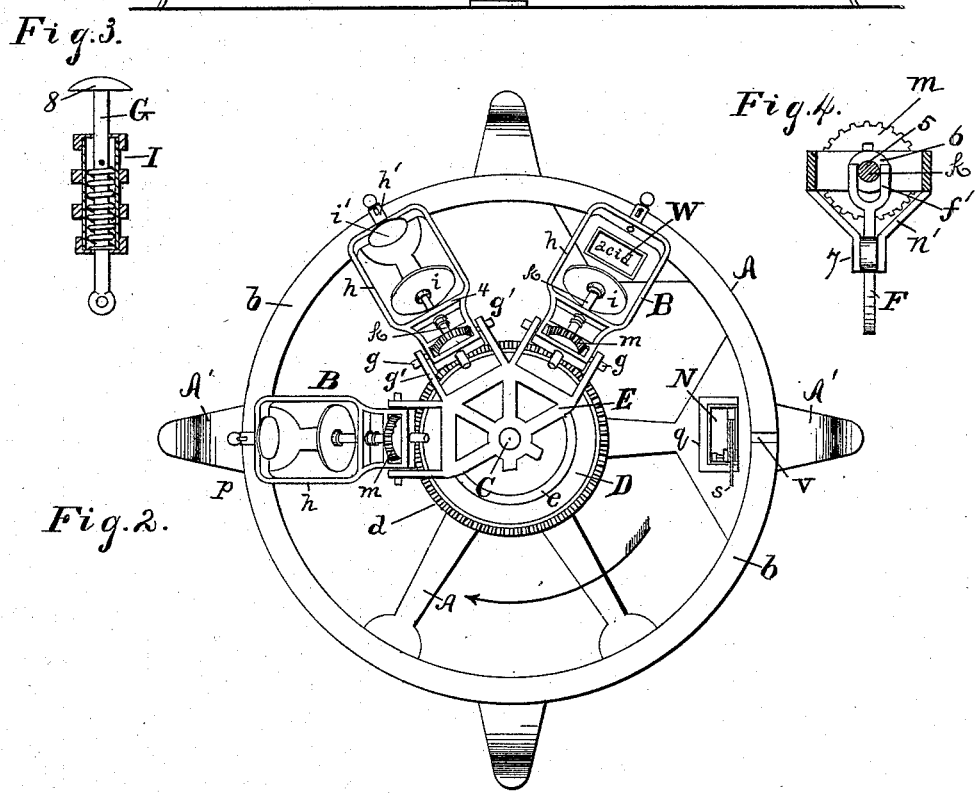
Fig. 3.
Fig. 2.
Fig. 4.
Witnesses:
John E. Morris
A. E. Eader
Inventor:
Jacob G. Jones
By his Atty
Chas B. Mann (No Model.)
2 Sheets—Sheet 2.

J. G. JONES.
CAN SOLDERING MACHINE.

No. 263,659. Patented Aug. 29, 1882.

Witnesses:
John E. Morris
A. C. Eader

Inventor:
Jacob G. Jones
By his Atty
Chas. B. Mann

UNITED STATES PATENT OFFICE.

JACOB G. JONES, OF BALTIMORE, MARYLAND, ASSIGNOR OF ONE-HALF TO HORACE K. THURBER, OF NEW YORK, N. Y.

CAN-SOLDERING MACHINE.

SPECIFICATION forming part of Letters Patent No. 263,659, dated August 29, 1882.

Application filed February 1, 1882. (No model.)

*To all whom it may concern:*

Be it known that I, JACOB G. JONES, a citizen of the United States, residing at Baltimore, in the State of Maryland, have invented certain new and useful Improvements in Can-Soldering Machines, of which the following is a specification, reference being had therein to the accompanying drawings.

My invention relates to a machine for soldering the end seams of cans. The construction and operation of the same will first be described, and then those parts and combinations which constitute the invention will be designated in the claims.

Figure 5:
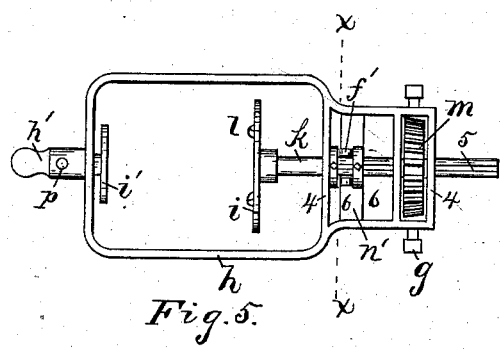
Figure 6:
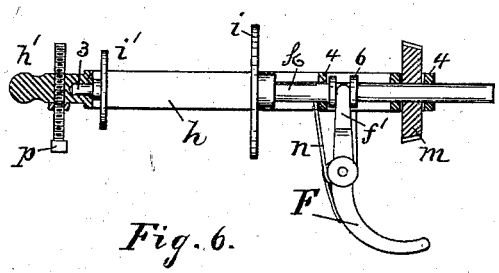
Figure 7:
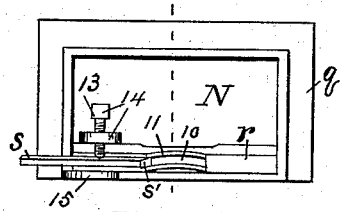
Figure 8:
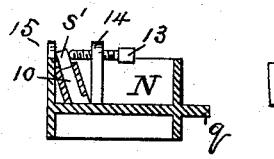
Figure 9:
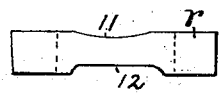
Figure 10:
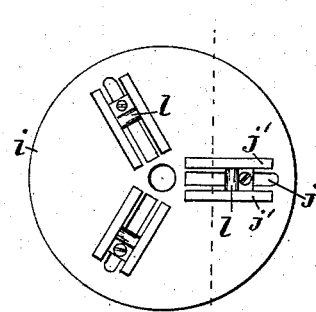
Figure 11:
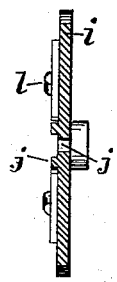
Figures 12, 13:
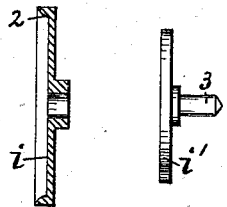

In the drawings hereto annexed, Figure 1 is a vertical sectional elevation. Fig. 2 is a top view, which shows the stand complete; but the hub to which the can-holders are pivoted is broken, and only three of the can-holders are shown. Fig. 3 is a vertical section (enlarged) of the pulling-down device which operates the retracting-lever. Fig. 4 is a view of the retracting-lever and coacting parts, taken on the line $x\,x$ of Fig. 5. Fig. 5 is a top or plan view of the can-holder and frame. Fig. 6 is a longitudinal section of the same. Fig. 7 is a top view (enlarged) of the solder-applying device. Fig. 8 is a cross-section of same on the line shown in Fig. 7. Fig. 9 is a view of part of the soldering-iron detached. Fig. 10 is a front view of the large part of the can-clamp. Fig. 11 is a cross-section of the same on the line shown in Fig. 10. Fig. 12 is a diametrical cross-section of the large part of the can-clamp, showing it provided with a flange. Fig. 13 is a side view of the small part of the can-clamp.

The letter A designates the circular stand, supported on legs A'. The perimeter of this stand has a beveled-off or downward-sloping face, $b$, which serves as a track and supports one end of each can-holder B as it is moved around. A vertical shaft, C, is supported in a bearing, $a$, in the center of the stand. A beveled-gear wheel, D, is made fast to the shaft by a set-screw, $c$, and thereby is adapted to be adjusted vertically on the said shaft as may be desired. The teeth $d$ of the wheel are on the upper side and bevel downward. A raised ring-shaped surface, $e$, is also on the upper side of this wheel. A hub, E, above the gear-wheel, turns loosely around the vertical shaft. Sockets are formed on the lower side of the hub, into each of which a friction-roller, $f$, enters. These rollers rest upon the raised ring-shaped surface $e$ on the wheel, and thereby the free-turning hub is supported.

The can-holder consists of a frame, $h$, one end of which is pivoted by the pins $g$ to projections $g'$ on the hub. By this arrangement the opposite end of the frame is free to be raised and lowered. At each of two opposite ends of the frame is a disk or other clamping device, $i\,i'$, each adapted to press against the ends of a can. The clamps $i$, in order to center the end of the can, may have either a flange, 2, about its rim, (see Fig. 12,) to fit around the end of the can, or may have three radial slots, $j$, each of which has on its sides a raised straight bead, $j'$, which serves as a guide for the adjustable dogs $l$, which latter are secured by a set-screw, the whole operating like a chuck. The clamp $i'$ is at that end of the frame which is free to tilt down, and consists simply of a flangeless disk or other suitably-shaped clamp having a spindle-shank, 3, which enters a socket in the end of the frame, (see Fig. 6,) whereby said clamp may turn freely. The clamp $i$, by which one end of the can is centered, is mounted on a shaft, $k$, which turns in the bearings 4 at the pivoted end of the frame. This shaft has both a rotary and an endwise movement. By the rotary movement the clamp will cause the can to revolve, and by the endwise movement this clamp is retracted or drawn away from the other (its co-acting clamp) to permit a can to be inserted or removed from between the two clamps. The shaft $k$ is provided with a longitudinal groove, 5, and a bevel-pinion, $m$, has a feather to fit the groove, whereby while the pinion is fixed between two bearings, 4, where it rotates, the shaft may slide endwise through the pinion. Two collars, 6, are made fast to the shaft, and the forked end $f'$ of a lever, F, straddles the shaft between the two collars and serves to draw the shaft endwise, and thereby to retract the clamp $i$. A spring, $n$, is employed, which, by pressing on the lever F, serves to move the shaft in the opposite direction, thereby causing the clamps to bind against the ends of the can. The upper end of lever F is forked. As already stated, it is pivoted at 7 to a bracket, n', and its lower end is curved and points in the direction of the end of the shaft k. The lever F serves to release the can or to spread the clamps apart to permit the insertion of a can, and is operated by means of a pulling device, which presses the curved end of the lever down.

The pulling-down device consists of a rod, G, having a head, 8, to act on the curved lever. The rod moves vertically in a tube, I, which is vertically adjustable on the stand by means of screw-threads on the exterior of the tube, and two nuts, one above and one below. To the lower end of the rod a wire, 9, is attached and connects with a foot-treadle, L. By depressing the treadle the shaft k is moved endwise and the pressure of the clamp i on the can is released.

The can-holder frames are so pivoted to the hub that the pinion m will gear with the teeth of the beveled wheel D and permit the can-holder frames to be raised and lowered, which movement does not affect the rotation of the can-clamps nor their grip on the can, should one be in position between the clamps. The free end of the can-holder frame has a projection, h', which serves as a handle, by which each can-holder may be separately raised or lowered, or by which the free-turning hub and all the can-holders pivoted to the hub may be rotated in a horizontal plane. A regulating-screw, p, enters vertically through the projection h'. The lower end of the screw (which may be the head or the point, it is immaterial which) rests and slides upon the beveled or sloping-faced track b of the circular stand, and thus supports the free end of the can-holder. The object of having this part in the form of a screw is to regulate the height of the tilting frame above the solder-applying device, so as to suit cans of different sizes.

The solder-applying device required in a machine of this construction is one which shall be sustained in a fixed position and be capable of holding molten solder and have a top opening to admit of the end seam of a can being inserted into the solder. In the present instance this device consists (see Figs. 7, 8, and 9) of an open-topped vessel, N, provided with an outside horizontal flange, q, by which it is supported on the stand. An iron, r, has a vertical central slot, 10, extending through it, and the two top edges of the slot are concaved, as at 11, to adapt them to fit the cylindrical end of a can. The two bottom edges are cut away, as at 12, to allow the molten solder in the vessel to flow into the slot, which latter should be kept full to the top concaved edges by the addition to the vessel from time to time of cold solder. An adjustable iron, S, extends lengthwise in the same direction as the slot, and one of its ends, S', is placed at one end of the concaved edges in the iron r. The end S' of the adjustable iron is beveled off to fit the can, and this iron is held in position by a set-screw, 13, bearing against the iron on one side, (the said set-screw being supported in a stud, 14,) and by a stud, 15, on the other side. When the beveled end of the iron S is worn by cans bearing and turning thereon the iron may be adjusted by loosening the set-screw.

A heater of some kind is required to keep the solder in the vessel N in a molten condition, and in the present instance this necessary adjunct is supplied by a self-generating vapor-burner, T, which is designed to be supplied with liquid hydrocarbon fuel through the pipe u, communicating with a source of supply. The burner is arranged below the vessel M, which contains the solder.

The beveled circular track b of the stand is provided with a notch, v, located immediately opposite the solder-applying device. This notch receives the lower end of the regulating-screw p, and thereby serves to stop the rotation of the hub and its attached can-holders at exactly the right point to properly effect the soldering of a can.

The letter W designates a receptacle for containing acid flux, and is attached to the stand. This device may be arranged or constructed in any desired manner. I usually employ a vessel or receptacle to hold a sponge, (not shown,) which is kept saturated with a suitable fluxing acid.

The letter y denotes a pulley on the vertical shaft by which the machine is driven.

The operation of the machine may be described as follows: The machine being set in motion, all the can-clamps i will revolve. By depressing the treadle a can may be inserted in one of the holders, as shown at the left-hand side of Fig. 1, where the can has an inclined position. In the same manner each holder may receive a can. When the can in moving around the stand arrives at the fluxing-receptacle there is a pause in the movement of the hub, while the can rotates over the acid-sponge. In order to permit the hub to move again to bring the fluxed can to the solder-applying device, the free end of that tilting can-holder whose regulating-screw p may be in the notch v must be raised. When the fluxed can reaches the proper position over the solder-applying device the regulating-screw drops into the notch. Thereby the movement of the hub is checked, and at the same time the lower end of the can is brought in contact with the molten solder in the vessel. By the rotation of the can the end seam is soldered. By lifting the handle h' the can-holder may be raised to move away and permit the next can-holder to be brought to the proper position. The soldered can will continue without intermission to revolve (which facilitates the cooling of the solder and prevents it from settling at one part of the seam) until it has traveled around the stand to that point where the pulling-down device is located, where, by depressing the treadle, the can may be released from the clamps and another can inserted.

As this machine solders one end of a can at a time, it is necessary where both ends are to be soldered to change ends and pass the can around the second time.

Having described my invention, I claim and desire to secure by Letters Patent of the United States—

1. In a can-soldering machine, the combination of a vertical shaft, a hub to turn freely on the shaft, a molten-solder-applying device, a smooth-surfaced circular track, a frame having one end pivoted to the hub and the other end to rest and slide on the circular track, and a rotary can-holder mounted in the frame, said can-holder consisting of disks which clamp the opposite end of a can, as set forth.

2. In a can-soldering machine, the combination of a vertical shaft, a hub to turn freely on the shaft, a gear-wheel made fast to the same shaft, a smooth-surfaced circular track, a frame having one end pivoted to the hub and the other end to rest and slide on the circular track, a rotary can-holder mounted in the frame, and mechanism connecting the gear-wheel on the vertical shaft with the can-holder to cause the latter to rotate, as set forth.

In testimony whereof I affix my signature in presence of two witnesses.

JACOB G. JONES.

Witnesses:
CHAS. B. MANN,
JNO. T. MADDOX.